(12) United States Patent
Yamamoto

(10) Patent No.: US 11,290,013 B2
(45) Date of Patent: Mar. 29, 2022

(54) INTEGRATED CIRCUIT APPARATUS INCLUDING REGULATOR CIRCUITS

(71) Applicant: MINEBEA MITSUMI Inc., Nagano (JP)

(72) Inventor: Kosuke Yamamoto, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 28 days.

(21) Appl. No.: 16/931,829

(22) Filed: Jul. 17, 2020

(65) Prior Publication Data

US 2021/0028699 A1 Jan. 28, 2021

(30) Foreign Application Priority Data

Jul. 25, 2019 (JP) .............................. JP2019-137128

(51) Int. Cl.
*H02M 3/158* (2006.01)
*H02M 1/08* (2006.01)
*G01N 27/22* (2006.01)
*H02M 1/00* (2006.01)

(52) U.S. Cl.
CPC ............ *H02M 3/158* (2013.01); *H02M 1/08* (2013.01); *G01N 27/223* (2013.01); *H02M 1/0006* (2021.05); *H02M 1/0032* (2021.05)

(58) Field of Classification Search
CPC ............ G05F 1/563; G05F 1/59; G05F 1/565
See application file for complete search history.

(56) References Cited

U.S. PATENT DOCUMENTS

| | | | |
|---|---|---|---|
| 6,424,128 B1 | 7/2002 | Hiraki et al. | |
| 6,560,157 B2 | 5/2003 | Sugita et al. | |
| 2004/0174149 A1* | 9/2004 | Agari | G05F 1/565 323/271 |
| 2009/0295344 A1* | 12/2009 | Qu | H02M 3/156 323/265 |
| 2013/0169246 A1* | 7/2013 | Shao | G05F 1/563 323/266 |
| 2017/0063229 A1* | 3/2017 | Powell | G05F 1/59 |
| 2020/0158675 A1 | 5/2020 | Inoue et al. | |
| 2020/0158676 A1 | 5/2020 | Inoue et al. | |

FOREIGN PATENT DOCUMENTS

| | | |
|---|---|---|
| JP | 2001-211640 | 8/2001 |
| JP | 4583588 | 11/2010 |
| JP | 2014-106990 | 6/2014 |

* cited by examiner

*Primary Examiner* — Kyle J Moody
*Assistant Examiner* — Lakaisha Jackson
(74) *Attorney, Agent, or Firm* — IPUSA, PLLC

(57) ABSTRACT

An integrated circuit apparatus includes a first regulator circuit configured to generate a first regulated voltage; a second regulator circuit configured to generate a second regulated voltage; and a control circuit configured to perform selection with respect to the first regulator circuit and the second regulator circuit such that one regulator circuit among the first regulator circuit and the second regulator circuit is in an on-state and another regulator circuit is in an off-state. The control circuit is configured to: cause the second regulator circuit to be in the on-state upon detecting that a load current is greater than or equal to a predetermined load current; and cause the first regulator circuit to be in the on-state upon detecting that the load current is less than the predetermined load current.

18 Claims, 7 Drawing Sheets

FIG.9

|  | OPERATION STATE | | |
|---|---|---|---|
|  | SLEEP | ACTIVE | STANDBY |
| FIRST REGULATOR CIRCUIT | ON | OFF | OFF |
| SECOND REGULATOR CIRCUIT | OFF | ON | ON |
| FIRST ANALOG CIRCUIT (POR CIRCUIT) | ON | ON | ON |
| FIRST ANALOG CIRCUIT (TIMER) | OFF | OFF | ON |
| SECOND ANALOG CIRCUIT | OFF | ON | OFF |
| FIRST DIGITAL CIRCUIT | ON | ON | ON |
| SECOND DIGITAL CIRCUIT | OFF | ON | OFF |

INTEGRATED CIRCUIT APPARATUS INCLUDING REGULATOR CIRCUITS

CROSS-REFERENCE TO RELATED APPLICATION

This application claims priority under 35 U.S.C. § 119 to Japanese Patent Application No. 2019-137128, filed Jul. 25, 2019, the contents of which are incorporated herein by reference in their entirety.

BACKGROUND OF THE INVENTION

1. Field of the Invention

The present disclosure relates to an integrated circuit apparatus.

2. Description of the Related Art

In general, semiconductor integrated circuit apparatuses are provided with regulator circuits to generate an internal voltage corresponding to a withstand capability of a transistor, based on a power supply voltage, because the withstand capability of the transistor decreases due to the microfabricated apparatuses. Such a regulator circuit minimizes variation in the internal voltage of the apparatus (see, for example, Japanese Unexamined Patent Application No. 2014-106990 that is hereinafter referred to as Patent document 1).

For example, the integrated circuit apparatus provided with the regulator circuit is used as a sensor integrated circuit apparatus that drives a microelectromechanical systems (MEMS) sensor and that performs signal processing of an output signal of the sensor.

SUMMARY

According to the techniques described below, an integrated circuit apparatus includes a first regulator circuit configured to generate a first regulated voltage; a second regulator circuit configured to generate a second regulated voltage; and a control circuit configured to perform selection with respect to the first regulator circuit and the second regulator circuit such that one regulator circuit among the first regulator circuit and the second regulator circuit is in an on-state and another regulator circuit is in an off-state. The control circuit is configured to: cause the second regulator circuit to become in the on-state upon detecting that a load current is greater than or equal to a predetermined load current; and cause the first regulator circuit to be in the on-state upon detecting that the load current is less than the predetermined load current.

BRIEF DESCRIPTION OF THE DRAWINGS

FIG. 9 is a diagram illustrating an example of the state of each circuit in operation states.

DESCRIPTION OF THE EMBODIMENTS

Related art information relevant to the present disclosure recognized by the inventor of this application will be provided below. In the integrated circuit apparatus described in Patent document 1, the regulator circuit is required to have a current capability corresponding to a load of a lord circuit to which an internal voltage is supplied.

In the configuration of the integrated circuit apparatus described in Patent document 1, the load of the load circuit to which the internal voltage is supplied, by the regulator circuit varies according to an operation state of the apparatus. The load during an active time becomes heavier loading than that during a sleep time. Thus, the regulator circuit is required to be designed to have the current capability to withstand the load during the active time.

However, power consumption for the regulator circuit increases as the current capability increases. For this reason, when the regulator circuit is designed to have the current capability to withstand the load during the active time, there may be a problem of power being wastefully consumed during the sleep time.

The present disclosure has an object to avoid wasteful power consumption for an integrated circuit apparatus provided with regulator circuits.

According to one or more embodiments, wasteful power consumption for an integrated circuit apparatus provided with regulator circuits can be avoided.

Embodiment

Hereinafter, the embodiment of the present disclosure will be described with reference to the drawings. In each figure, the same numerals denote the same components; accordingly, duplicative explanation for the components may be omitted.

Figure 1:
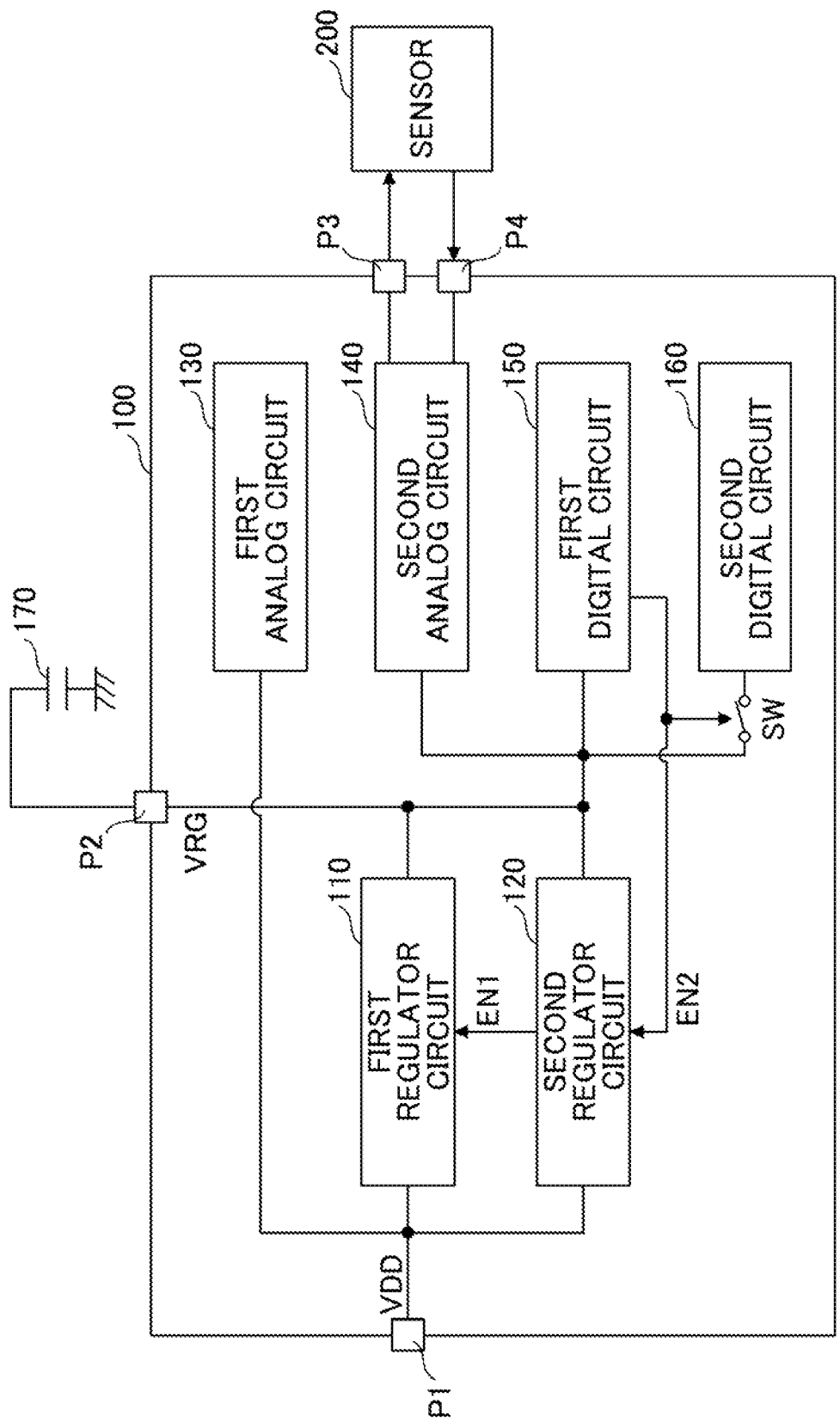
FIG. 1 is a block diagram illustrating an example of the configuration of an integrated circuit apparatus according to one embodiment.

FIG. 1 is a block diagram illustrating an example of the configuration of an integrated circuit apparatus according to one embodiment. As illustrated in FIG. 1, the integrated circuit apparatus 100 is an analog front end (AFE) that drives a sensor 200 and that controls an analog sensor signal from the sensor 200. The integrated circuit apparatus 100 is coupled between a digital signal processor (not illustrated) such as a microcomputer, and the sensor 200. The integrated circuit apparatus 100 is a semiconductor integrated circuit formed with a semiconductor chip.

The integrated circuit apparatus 100 includes a first regulator circuit 110; a second regulator circuit 120; a first analog circuit 130; a second analog circuit 140; a first digital circuit 150; and a second digital circuit 160.

Each of the first regulator circuit 110 and the second regulator circuit 120 decreases a power supply voltage VDD that is supplied to the integrated circuit apparatus 100, via a terminal P1, from the outside (a microcomputer or the like), to thereby produce a regulated voltage VRG. Further, each of the first regulator circuit 110 and the second regulator circuit 120 supplies, as an internal voltage, the regulated voltage VRG to each component within the integrated circuit apparatus 100.

Each of the first regulator circuit 110 and the second regulator circuit 120 is a linear regulator, as described below in detail. The power consumption for the first regulator circuit 110 is less than the power consumption for the second regulator circuit 120. The first regulator circuit 110 or the second regulator circuit 120 is selected such that one regulator circuit from among the first regulator circuit and the second regulator circuit is in an on-state and the other regulator circuit is in an off-state. When a current passing through a load is greater than or equal to a predetermined load current, the second regulator circuit 120 is turned on. In contrast, when the current passing through the load is less than a predetermined load current, the first regulator circuit 110 is turned on. Note that the regulators may be switched according to the magnitude of a load current that is detected by a current detecting circuit. Alternatively, when load variation in a given operation state is identified in advance, a control circuit may switch the regulators according to a given operation state of the load, without monitoring the load.

The regulated voltage VRG generated by the first regulator circuit 110 or the second regulator circuit 120 is applied to a terminal P2. An external loading capacitance 170 is applied to the terminal P2.

The first analog circuit 130 includes a power-on reset (POR) circuit as a voltage monitoring circuit; a timer; and the like. The voltage monitoring circuit performs control to maintain the entire integrated circuit apparatus 100 in a reset state, until a power supply voltage level is stabilized. The voltage monitoring circuit operates during both of an active time and a sleep time, as described below. The timer operates during the active time, while an analog-to-digital (A/D) conversion circuit 143 (see FIG. 2) included in the second regulator circuit 120 intermittently operates. The timer stops during the sleep time.

The second analog circuit 140 performs a process of converting an analog sensor signal input from the sensor 200, via a terminal. P3.

Figure 2:
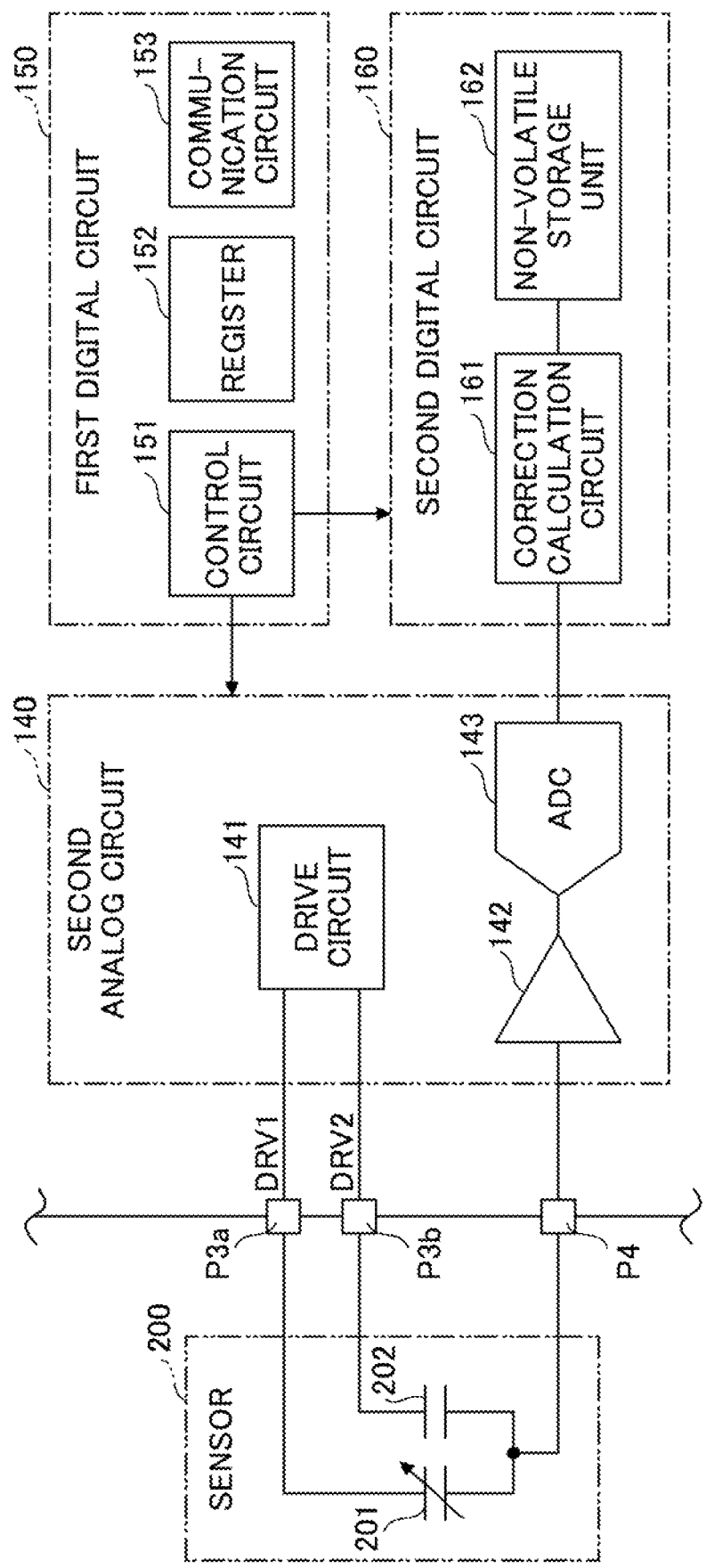
FIG. 2 is a diagram illustrating an example of the detailed configuration of a second analog circuit, a first digital circuit, a second digital circuit, and a sensor.

FIG. 2 is a diagram illustrating an example of the detailed configuration of the second analog circuit 140, the first digital circuit 150, the second digital circuit 160, and the sensor 200.

As illustrated in FIG. 2, the sensor 200 is a type of MEMS sensor, for example. In this description, the sensor 200 is a humidity sensor that measures relative humidity. According to the present embodiment, the sensor 200 includes a humidity-detection capacitor 201 of which capacitance varies according to humidity, and includes a reference capacitor 202 of which capacitance is constant regardless of humidity. The humidity-detection capacitor 201 is coupled between a terminal P3a and a terminal P4. The reference capacitor 202 is coupled between a terminal P3b and the terminal P4. The terminal P3a and the terminal P3b correspond to the terminal P3 illustrated in FIG. 1.

The second analog circuit 140 includes a drive circuit 141; a capacitance-to-voltage (CV) conversion circuit 142; the A/D conversion circuit 143; and the like. The drive circuit 141 generates a first drive signal DRV1 that is an AC drive signal having a rectangular waveform, as well as a second drive signal DRV2 that is an AC drive signal having a rectangular waveform. The second drive signal DRV2 has a phase opposite the first drive signal DRV1. The drive circuit 141 applies the first drive signal DRV1 to the humidity-detection capacitor 20 via the terminal P3a. The drive circuit 141 applies the second drive signal DRV2 to the reference capacitor 202 via the terminal P3b.

In the following description, a period during which the first drive signal DRV1 is at high level and the second drive signal DRV2 is at low level is referred to as a first charge transfer period. A period during which the first drive signal DRV1 is at low level and the second drive signal DRV2 is at high level is referred to as a second charge transfer period.

The CV conversion circuit 142 is a charge-voltage conversion circuit in a switched capacitor system. The CV conversion circuit 142 acquires a signal charge output from the sensor 200, during the first charge transfer period, as well as a signal charge output from the sensor 200, during the second charge transfer period. During each charge transfer period, the signal charge is acquired through the terminal P4. The CV conversion circuit 142 converts each of the acquired signal charges into a voltage, and outputs the voltage to the A/D conversion circuit 143.

The A/D conversion circuit 143 is a differential input AD converter. The A/D conversion circuit 143 converts a difference value of the magnitude between the two voltages input from the CV conversion circuit 142, into a digital signal. The A/D conversion circuit 143 outputs the difference value. The difference value corresponds to a measured value of relative humidity. The digital signal output from the A/D conversion circuit 143 is input to the second digital circuit 160.

The second digital circuit 160 includes a correction calculation circuit 161; a non-volatile storage unit 162; and the like. The correction calculation circuit 161 is a digital filter that correctly calculates the digital signal input from the second analog circuit 140. The non-volatile storage unit 162 is a semiconductor memory such as a flash memory. The non-volatile storage unit 162 stores the digital signal (sensor value) that the correction calculation circuit 161 correctly calculates.

The second digital circuit 160 is coupled to the first regulator circuit 110 and the second regulator circuit 120 (see FIG. 1). A switch SW illustrated in FIG. 1 is turned on or off in accordance with the enable signal EN2 described below, the enable signal EN2 being output from the first digital circuit 150. The switch SW is in an on-state during the active time described below. The switch SW is provided to reduce leakage current during the sleep time.

The first digital circuit 150 includes a control circuit 151; a register 152; a communication circuit 153; and the like. The control circuit 151 controls each component within the integrated circuit apparatus 100. The second analog circuit 140 and the second digital circuit 160 are each controlled by the control circuit 151. Each of the second analog circuit 140 and the second digital circuit 160 operates during the active time during which the sensor value is acquired. In contrast, each of the second analog circuit 140 and the second digital circuit 160 does not operate during the sleep time during which the sensor value is not acquired.

The register 152 stores various information. The communication circuit 153 is a communication circuit that performs communication in a serial transmission system such as inter-integrated circuit (I2C) communication. The communication circuit 153 performs data communication with the non-volatile storage unit 162 or an external microcomputer.

In a manner such that the communication circuit 153 always performs data communication with the external microcomputer, the first digital circuit 150 is configured to operate even during the sleep time.

Figure 3:
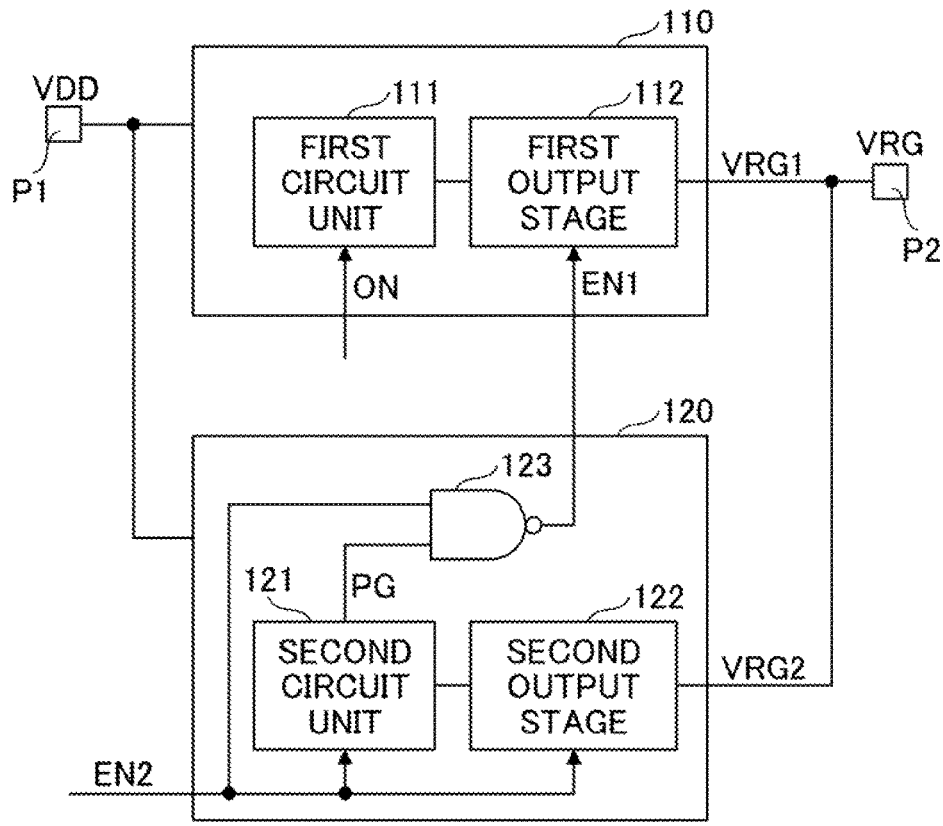
FIG. 3 is a block diagram illustrating an example of the configuration of a first regulator circuit and a second regulator circuit.

FIG. 3 is a block diagram illustrating an example of the configuration of the first regulator circuit 110 and the second regulator circuit 120. In the following description, the regulated voltage generated by the first regulator circuit 110 is referred to as a first regulated voltage VRG1, and the regulated voltage generated by the second regulator circuit 120 is referred to as a second regulated voltage VRG2. The first regulated voltage VRG1 and the second regulated voltage VRG2 are set at the same voltage level.

As illustrated in FIG. 3, the first regulator circuit 110 includes a first circuit unit 111 and a first output stage 112. The first regulator circuit 110 is a linear regulator. A voltage level of the first regulated voltage VRG1 that is generated by the first regulator circuit 110 is monitored by the voltage monitoring circuit included in the first analog circuit 130 that is coupled to the first circuit unit 111.

The first circuit unit 111 is always in an on-state while the integrated circuit apparatus 100 is operating. The first output stage 112 is turned on or off in accordance with the enable signal EN1 input from the second regulator circuit 120.

The second regulator circuit 120 includes a second circuit unit. 121, a second output stage 122, and a NAND circuit 123. The second regulator circuit 120 is a linear regulator.

The second circuit unit 121 and the second output stage 122 are each turned on or off in accordance with the enable signal EN2 input from the control circuit 151 included in the first digital circuit 150.

The voltage monitoring circuit included in the first analog circuit 130 that is coupled to the second circuit unit 121 monitors the voltage level of the second regulated voltage VRG2 generated by the second regulator circuit 120. A power good-signal generating unit outputs a power good signal PG in accordance with the voltage level monitored by the voltage monitoring circuit; and with a level of the current applied by a given regulator. Specifically, after the second circuit unit 121 and the second output stage 122 have become in an on-state, the voltage monitoring circuit causes the power good signal PG to be at low level until the second regulated voltage VRG2 reaches a reference value. In contrast, when the second regulated voltage VRG2 reaches the reference value, the voltage monitoring circuit causes the power good signal PG to be at high level.

The enable signal EN2 and the power good signal PG are input to the NAND circuit 123. The NAND circuit 123 outputs the enable signal EN1 at a level that is obtained by a non-conjunction of the enable signal EN2 and the power good signal PG.

Specifically, when the enable signal EN2 is at low level, the NAND circuit 123 outputs the enable signal EN1 at high level, regardless of the level of the power good signal PG. When the enable signal EN2 is at high level, the NAND circuit 123 outputs the enable signal EN1 at high level until the power good signal PG is changed to a high level. When the power good signal PG becomes at high level, the NAND circuit 123 outputs the enable signal EN1 at low level.

The first output stage 112 of the first regulator circuit 110 becomes in an off-state, in response to inputting the enable signal EN1 at Low level.

Figure 4:
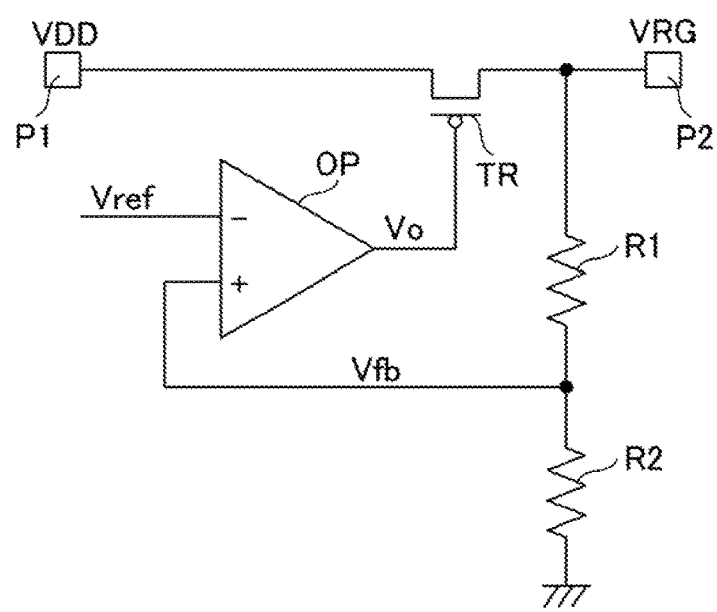
FIG. 4 is a circuit diagram illustrating an example of a linear regulator that constitutes each of the first regulator circuit and the second regulator circuit.

FIG. 4 is a circuit diagram illustrating an example of the linear regulator that constitutes each of the first regulator circuit 110 and the second regulator circuit 120. The linear regulator includes an output transistor TR; feedback resistors R1 and R2; and an operational amplifier OP as a difference amplifier.

The output transistor TR is, for example, a P-channel MOS transistor. In the output transistor TR, a source and a drain are coupled between the terminal P1 as an input source to which the power supply voltage VDD is applied, and the terminal P2 from which the regulated voltage VRG is output. A gate of the output transistor TR is coupled to an output terminal of the operational amplifier OP.

The feedback resistors R1 and R2 are coupled in series between the terminal P2 and a ground. A feedback voltage Vfb obtained by dividing the regulated voltage VRG is applied to a positive terminal of the operational amplifier OP. A reference voltage Vref is applied to a negative terminal of the operational amplifier OP, by a reference voltage source.

The operational amplifier OP outputs a voltage Vo obtained by amplifying a differential voltage associated with the two input terminals (positive terminal and the negative terminal). The output voltage Vo is applied to the gate of the output transistor TR. The operational amplifier OP decreases the output voltage Vo when the feedback voltage Vfb is higher than the reference voltage Vref. The operational amplifier OP increases the output voltage Vo when the feedback voltage Vfb is lower than or equal to the reference voltage Vref.

An on resistance associated with the output transistor TR is controlled according to the output voltage Vo, so that the regulated voltage is maintained at a level at which the voltage is constant (target voltage).

Note that the output transistor TR is included in each of the first output stage 112 and the second output stage 122 described above. The operational amplifier OP is included in each of the first circuit unit 111 and the second circuit unit 121.

The first regulator circuit 110 and the second regulator circuit 120 differ in a current capability of each of the output transistor TR and the operational amplifier OP. The output transistor TR of the second regulator circuit 120 has an increased drive capability than the output transistor TR of the first regulator circuit 110. The current passing through the operational amplifier OP of the second regulator circuit 120 is larger than the current passing through the operational amplifier OP of the first regulator circuit 110.

Figure 5:
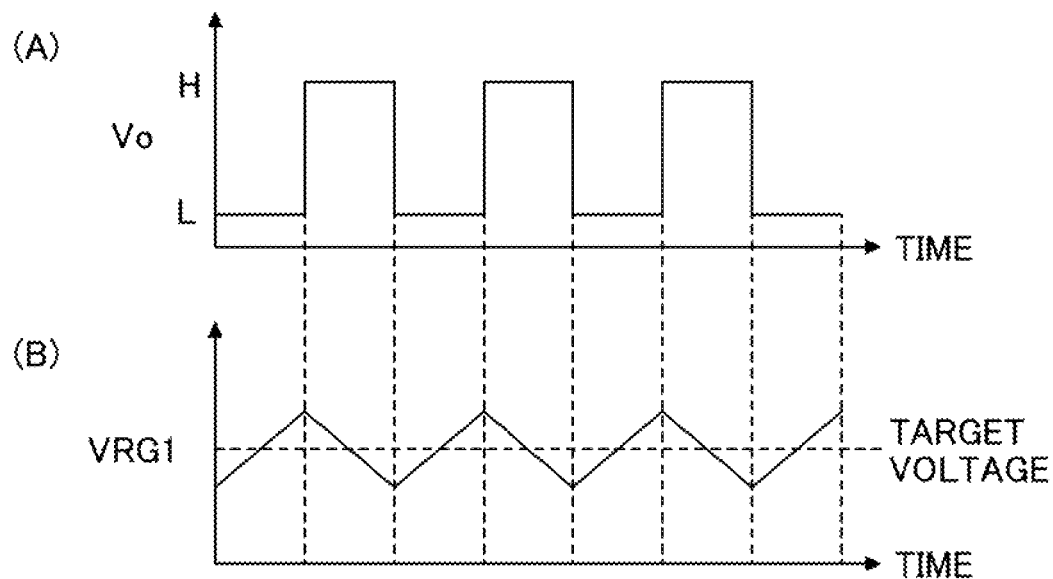
FIG. 5 is a diagram illustrating an example of the operation of the first regulator circuit for which power consumption is low.

FIG. 5 is a diagram illustrating an example of the operation of the first regulator circuit 110 for which power consumption is low. FIG. 5 (A) illustrates a time change in the output voltage Vo of the operational amplifier OP. FIG. 5 (B) illustrates a time change in the first regulated voltage VRG1 that is generated by the first regulator circuit 110.

In the first regulator circuit 110, the current of the operational amplifier OP is small, and the output transistor TR has a small drive capability. In such a manner, when the first regulated voltage VRG1 varies according to variation in the power supply voltage VDD or the load, a time required for a feedback is long. Thereby, in the first regulator circuit 110, the output voltage Vo applied to the gate of the output transistor TR varies greatly between a high level (H) and a low level (L), as illustrated in FIG. 5 (A). Accordingly, the first regulator circuit 110 serves substantially as a comparator, so that the first regulated voltage VRG1 varies greatly relative to the target voltage, as illustrated in FIG. 5(B).

In such a manner, the first regulator circuit 110 advantageously allows for decreased power consumption. However, accuracy of the first regulated voltage VRG1 relative to the target voltage decreases.

Note that for the first regulator circuit 110, because a responsiveness is not high, when heavy loading is applied to the terminal. P2, the first regulated voltage VRG1 may decrease below a reset voltage before the output transistor TR is turned on.

Figure 6:
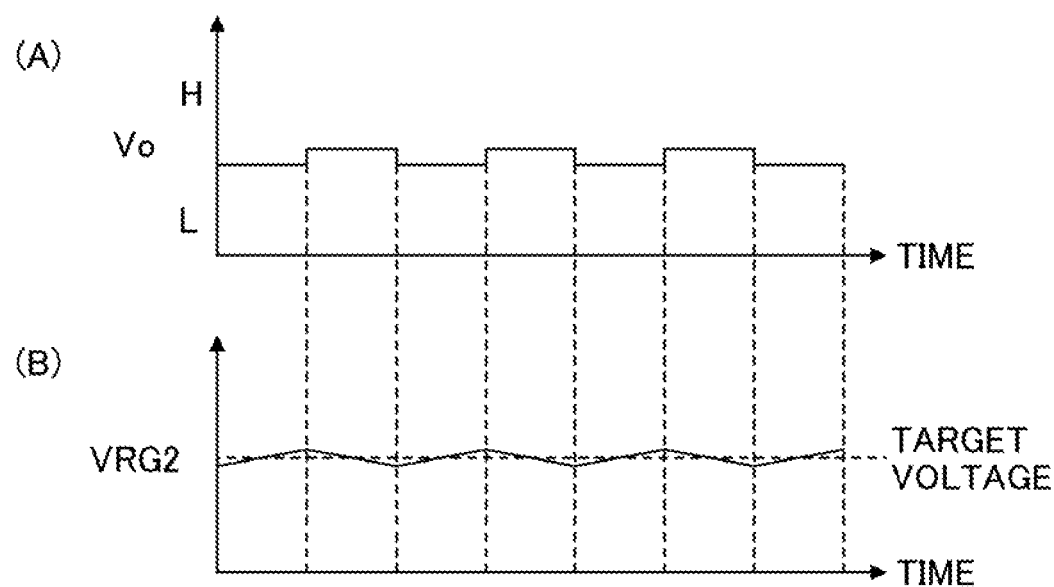
FIG. 6 is a diagram illustrating an example of the operation of the second regulator circuit for which power consumption is high.

FIG. 6 is a diagram illustrating an example of the operation of the second regulator circuit 120 for which power consumption is high. FIG. 6(A) illustrates a time change in the output voltage Vo of the operational amplifier OP. FIG. 6 (B) illustrates a time change in the second regulated voltage VRG2 that is generated by the second regulator circuit 120.

In comparison to the first regulator circuit 110, for the second regulator circuit 120, the current of the operational amplifier OP is large and the output transistor TR has a large drive capability. In such a manner, when the second regulated voltage VRG2 varies according to variation in the power supply voltage VDD or the load, a time required for a feedback decreases. Thereby, in the second regulator circuit 120, the output voltage Vo applied to the gate of the output transistor TR is almost unchanged relative to a constant voltage, as illustrated in FIG. 6 (A). Accordingly, for the second regulated voltage VRG2, a magnitude change relative to the target voltage decreases, as illustrated in FIG. 6(B). In other words, for the second regulated voltage VRG2, a rate of voltage variation at a time of heavy loading decreases in comparison to the first regulated voltage VRG1.

In such a manner, the power consumption for the second regulator circuit 120 is high. However, the second regulator circuit 120 advantageously allows for increased accuracy of the second regulated voltage VRG2 relative to the target voltage, as well as decreased noise.

Figure 7:
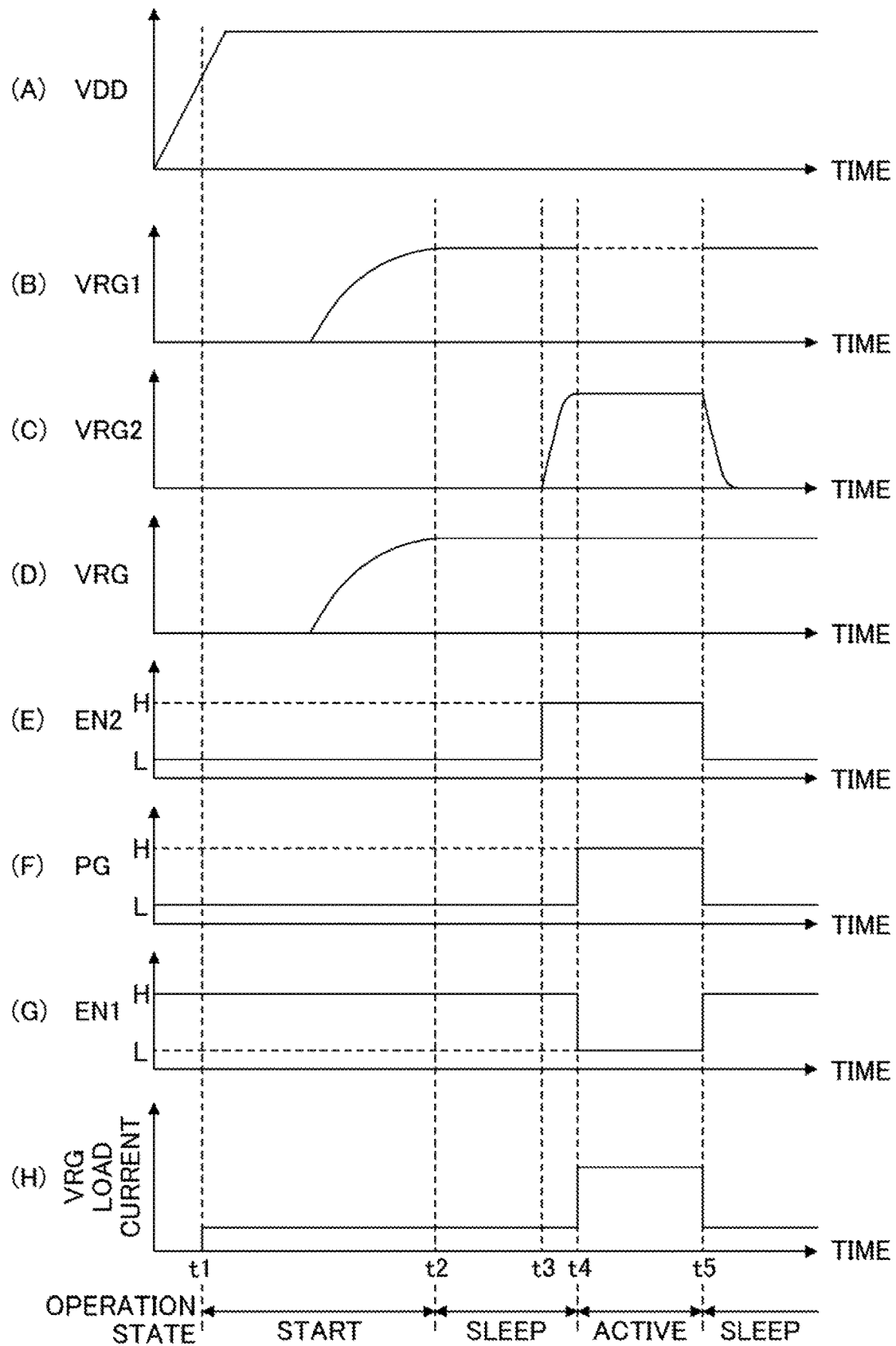
FIG. 7 is a timing diagram for explaining an example of the operation timing of the first regulator circuit and the second regulator circuit.

The operation of the first regulator circuit. 110 and the second regulator circuit 120 will be hereafter described. FIG. 7 is a timing diagram for explaining an example of the operation timing of the first regulator circuit 110 and the second regulator circuit 120.

FIG. 7(A) is a diagram illustrating the time change in the power supply voltage VDD. FIG. 7 (B) is a diagram illustrating the time change in the first regulated voltage VRG1 that is generated by the first regulator circuit 110. FIG. 7 (C) is a diagram illustrating the time change in the second regulated voltage VRG2 that is generated by the second regulator circuit 120. FIG. 7(D) is a diagram illustrating the time change in the regulated voltage VRG that is generated as the internal voltage, the regulated voltage VRG being based on the result in which the first regulated voltage VRG1 or the second regulated voltage VRG2 is selected.

FIG. 7(E) is a diagram illustrating the time change in the enable signal EN2 that is input to the first regulator circuit 110 from the control circuit 151. FIG. 7(F) is a diagram illustrating the time change in the power good signal PG that is generated by the power good-signal generating unit of the second regulator circuit 120. FIG. 7 (G) is a diagram illustrating the time change in the enable signal EN1 that is input to the first regulator circuit 110 from the second regulator circuit 120. FIG. 7(H) is a diagram illustrating the load current (VRG load current) passing through the load that is coupled to the terminal P2.

The first regulator circuit 110 and the second regulator circuit 120 are controlled by the control circuit 151. When the power supply voltage VDD is applied by an external device to the integrated circuit apparatus 100, the control circuit 151 supplies the enable signal EN2 at low level to the second regulator circuit 120. After the power supply voltage VDD finishes rising, the control circuit 151 causes the first regulator circuit 110 to transition from an off-state to an on-state, while causing the second regulator circuit 120 to be in an off-state. The integrated circuit apparatus 100 is in a start state until the first regulated voltage VRG1 reaches a predetermined voltage.

In the start state, because the enable signal EN2 is at low level, the second regulator circuit 120 is in an off-state without starting. Then, in response to inputting the enable signal EN2 at low level, the NAND circuit 123 in the second regulator circuit 120 sets the enable signal EN1 to be at high level, and outputs the enable signal EN1 to the first regulator circuit 110. In response to inputting the enable signal EN1 at high level, the first regulator circuit 110 starts (t=t2). Note that the first circuit unit 111 of the first regulator circuit 110 is always in an on-state.

At this time, because only the first regulator circuit 110, among the first regulator circuit 110 and the second regulator circuit 120, is operating, the first regulated voltage VRG1 generated by the first regulator circuit 110 is used as the internal voltage. In this case, the integrated circuit apparatus 100 is in a sleep state, so that the sensor value is not acquired. In other words, the second analog circuit 140 and the second digital circuit 160 do not operate to acquire the sensor value.

Then, in the sleep state, the control circuit 151 sets the enable signal EN2 to be at high level (t=t3). In this case, because the power good signal PG input to the NAND circuit 123 is at low level, the enable signal EN1 output from the NAND circuit 123 is maintained at high level.

When the enable signal. EN2 becomes at high level, the second regulator circuit 120 starts. The voltage monitoring circuit included in the first analog circuit 130 monitors the voltage level of the second regulated voltage VRG2. When the second regulated voltage VRG2 reaches the reference voltage, the voltage monitoring circuit causes the power good signal PG to be at high level (t=t4). When the power good signal PG becomes at high level, the enable signal EN1 output from the NAND circuit 123 changes to a low level, because the enable signal EN2 is at high level.

When the enable signal EN1 input to the first regulator circuit 110 becomes at low level, the first output stage 112 of the first regulator circuit 110 becomes in an off-state. Thereby, the second regulated voltage VRG2 generated by the second regulator circuit 120 is used as the internal voltage. In this case, the integrated circuit apparatus 100 becomes in an active state so that the second analog circuit 140 and the second digital circuit 160 are each turned on by the control circuit 151. Accordingly, the sensor value is acquired.

Then, when the enable signal. EN2 becomes at low level (t=t5), the second regulator circuit 120 stops. Further, the enable signal EN1 output from the NAND circuit 123 becomes at high level, so that the first output stage 112 of the first regulator circuit 110 becomes in an on-state. Thereby, the integrated circuit apparatus 100 again becomes in the sleep state. Accordingly, the first regulated voltage VRG1 generated by the first regulator circuit 110 is used as the internal voltage.

Figure 8:
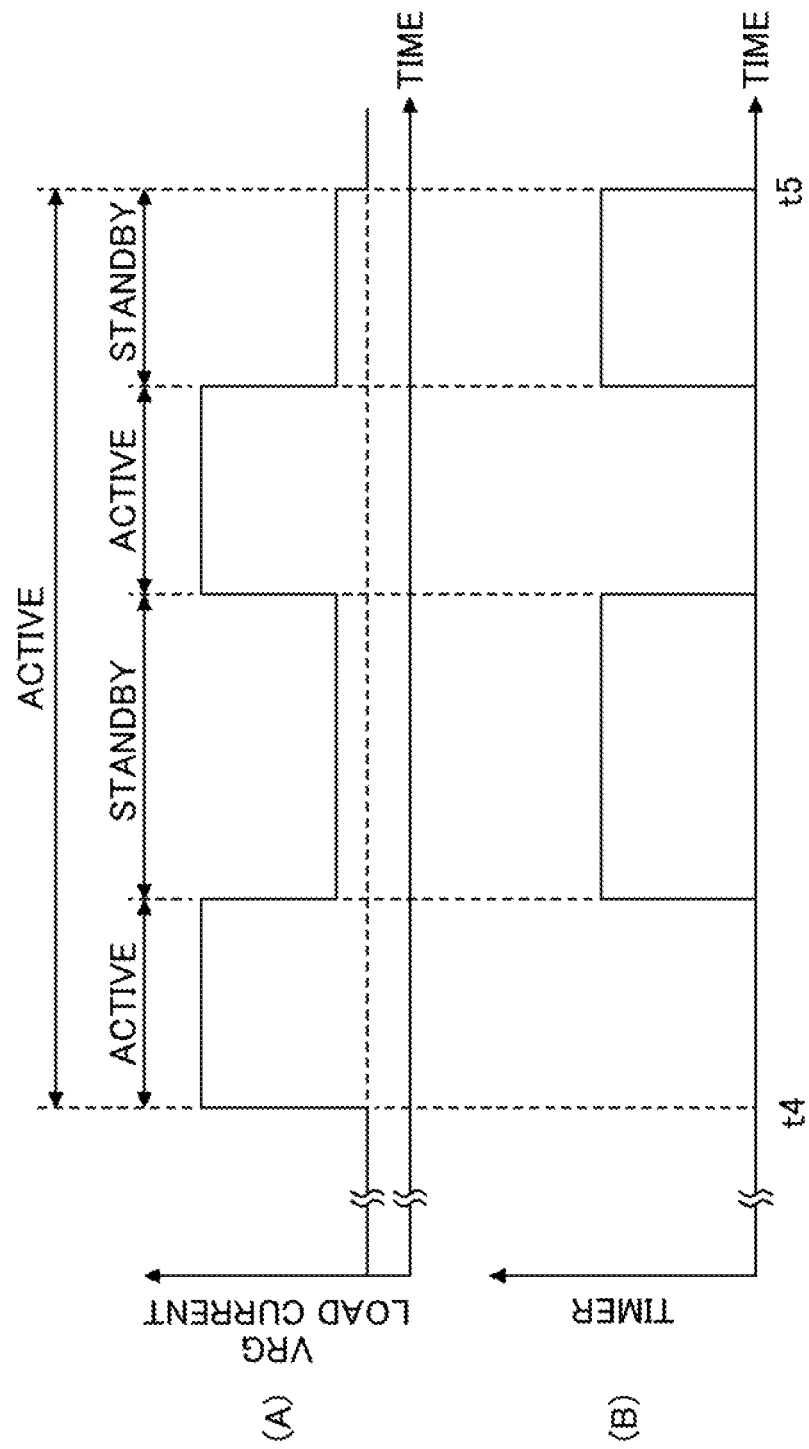
FIG. 8 is a diagram for explaining an example of the detailed operation during an active time.

FIG. 8 is a diagram illustrating an example of the detailed operation during the active time. FIG. 8A is a diagram illustrating variation in the VRG load current during the active time.

As illustrated in FIG. 8, the active period (period from t4 to t5) illustrated in FIG. 7 includes an active period during which the A/D conversion circuit 143 operates; and a standby period during which the A/D conversion circuit 143 stops. The standby period is measured by the timer included in the first analog circuit 130. The length of the standby period as well as the number of active periods may be appropriately modified by setting.

The VRG load current increases in the active period during which the A/D conversion circuit 143 operates, while decreasing in the standby period. In such a manner, the A/D conversion circuit 143 operates intermittently using the timer, so that the power consumption for the integrated circuit apparatus 100 decreases.

FIG. 9 is a table illustrating an example of the state of each circuit in the operation states. In the sleep state, only the first regulator circuit 110; the voltage monitoring circuit (POR circuit) of the first analog circuit 130; and the first digital circuit 150 are in an on-state. In the sleep state, an internal voltage of high accuracy and low noise is not required. Thus, the first regulator circuit 110 for which power consumption is low is in an on-state. Thereby, the first regulated voltage VRG1 is used as the internal voltage.

In the active state, the second regulator circuit 120; the voltage monitoring circuit (POR circuit) of the first analog circuit 130; the second analog circuit 140; the first digital circuit 150; and the second digital circuit 160 are each in an on-state. The active state involves the period during which the sensor value is mainly acquired. In such a state, because an internal voltage of high accuracy and low noise is required, the second regulator circuit 120 is in an on-state. Thereby, the second regulated voltage VRG2 allowing for high accuracy and low noise is used as the internal voltage.

In the standby state, the second regulator circuit 120; the voltage monitoring circuit (POR circuit) of the first analog circuit 130; the timer of the first analog circuit 130; and the first digital circuit 150 are each in an on-state. In the standby state as well, the second regulated voltage VRG2 is used as the internal voltage.

In such a manner, in the integrated circuit apparatus 100 according to the present embodiment, the second regulator circuit 120 that generates the second regulated voltage VRG2 allowing for high accuracy and decreased noise is selected during the active time (during the active time and the standby time). In contrast, during the sleep time, the first regulator circuit 110 for which power consumption is low is selected. Thereby, wasteful power consumption is minimized.

As described above, either of the first regulator circuit 110 or the second regulator circuit 120 is exclusively selected. Further, as illustrated in FIG. 7, in the period (period from t3 to t4) during which the integrated circuit apparatus 100 is transitioned from the sleep state to the active state, the enable signals EN1 and EN2 are both set to be at high level, so that both of the first regulator circuit 110 and the second regulator circuit 120 operate.

This is because, when the second regulator circuit 120 is turned on and synchronously the first regulator circuit 110 is turned off, the first regulated voltage VRG1 decreases due to the increased load current, so that the internal voltage may drop below the reset voltage. For this reason, according to the present embodiment, after the second regulated voltage VRG2 rises, when the integrated circuit apparatus is transitioned from the sleep state to the active state, the first regulator circuit 110 and the second regulator circuit 120 both operate such that the regulated voltage VRG1 does not decrease to the reset voltage.

Note that when the integrated circuit apparatus 100 is transitioned from the active state to the sleep state (t=t5), the second regulator circuit 120 is turned off and synchronously the first regulator circuit 110 is turned on. In this regard, this is because the load current instantaneously decreases so that the internal voltage does not thereby drop below the reset voltage. In the first regulator circuit 110, because only the first output stage 112 is turned off in the active period (period from t4 to t5), a time required for a return to a normal state decreases when the first regulator circuit 110 is turned on. This is one reason that the second regulator circuit 120 is turned off and synchronously the first regulator circuit 110 is turned on.

Note that according to the above embodiment, as illustrated in FIG. 1, the control circuit 151 supplies the enable signal EN2 to the second regulator circuit 120, and the second regulator circuit 120 supplies the enable signal EN1 to the first regulator circuit 110. However, the control circuit 151 may respectively supply the enable signal EN1 and the enable signal EN2 to the first regulator circuit 110 and the second regulator circuit 120, at the timing illustrated in FIG. 7.

According to the above embodiment, the sensor 200 is a humidity sensor. However, the sensor 200 is not limited to the humidity sensor, and may include a pressure sensor, a temperature sensor, an air flow sensor, or the like.

One or more embodiments have been described above. However, the present disclosure is not limited to the embodiments described above. Modifications or alternatives of the above embodiments can be made within a scope of the present disclosure.

What is claimed is:

1. An integrated circuit apparatus comprising:
    a first regulator circuit configured to generate a first regulated voltage;
    a second regulator circuit configured to generate a second regulated voltage;
    a control circuit configured to perform selection with respect to the first regulator circuit and the second regulator circuit such that one regulator circuit among the first regulator circuit and the second regulator circuit is in an on-state and another regulator circuit is in an off-state, and
    a voltage monitoring circuit electrically coupled to the first regulator circuit and configured to detect that the second regulated voltage reaches a reference level,
    wherein the control circuit is configured to:
        detect that a load current is greater than or equal to a predetermined load current;
        cause the second regulator circuit to transition from the off-state to the on-state upon detecting that the load current is greater than or equal to the predetermined load current; and
        cause the first regulator circuit to be in the off-state upon detecting by the voltage monitoring circuit that the second regulated voltage reaches the reference level, so that the second regulated voltage is supplied to the load.

2. The integrated circuit apparatus according to claim 1, wherein each of the first regulator circuit and the second regulator circuit is a linear regulator.

3. The integrated circuit apparatus according to claim 1, further comprising an analog circuit electrically coupled to a sensor, the analog circuit being configured to drive the sensor to acquire a sensor value.

4. The integrated circuit apparatus according to claim 3, wherein the control circuit is configured to:
    cause the second regulator circuit to be in the on-state, during an active time during which the sensor value is acquired; and
    cause the first regulator circuit to be in the on-state, during a sleep time during which the sensor value is not acquired.

5. The integrated circuit apparatus according to claim 1, wherein the control circuit is configured to:
  detect that the load current is less than the predetermined load current; and
  cause the first regulator circuit to be in on-state upon detecting that the load current is less than the predetermined load current.

6. The integrated circuit apparatus according to claim 5, wherein power consumption for the second regulator circuit is greater than power consumption for the first regulator circuit, and
  wherein, for the second regulated voltage, a rate of voltage variation at a time of heavy loading is small in comparison to the first regulated voltage.

7. The integrated circuit apparatus according to claim 5, wherein the first regulator circuit includes a first circuit unit and a first output stage, and
  wherein the control circuit is configured to cause the first regulator circuit to be in the off-state, such that in the first regulator circuit, only the first output stage is in the off-state.

8. The integrated circuit apparatus according to claim 7, wherein the control circuit is configured to cause the second regulator circuit to transition from the on-state to the off-state, such that the first output stage of the first regulator circuit becomes in the on-state.

9. The integrated circuit apparatus according to claim 5, wherein, after a power supply voltage is applied to the integrated circuit apparatus by an external device, and the power supply voltage finishes rising within the integrated circuit apparatus, the control circuit is configured to:
  cause the first regulator circuit to transition from the off-state to the on-state; and
  cause the second regulator circuit to be in the off-state, so that a start state of the integrated circuit apparatus is maintained until the first regulated voltage reaches a predetermined voltage.

10. An integrated circuit apparatus comprising:
  a constant voltage circuit, the circuit including
    a first regulator circuit configured to generate a first regulated voltage,
    a second regulator circuit configured to generate a second regulated voltage, and
    a control circuit configured to perform selection with respect to the first regulator circuit and the second regulator circuit such that one regulator circuit among the first regulator circuit and the second regulator circuit is in an on-state and another regulator circuit is in an off-state, and
  an analog circuit electrically coupled to a sensor, the analog circuit being configured to drive the sensor to acquire a sensor value,
  wherein the control circuit is configured to:
    detect that a load current of the constant voltage circuit is greater than or equal to a predetermined level, during an active time during which the sensor value is acquired, to cause the second regulator circuit to be in the on-state; and
    detect that the load current of the constant voltage circuit is less than the predetermined level, during a sleep time during which the sensor value is not acquired, to cause the first regulator circuit to be in the on-state.

11. The integrated circuit apparatus according to claim 10, wherein power consumption for the second regulator circuit is greater than power consumption for the first regulator circuit, and
  wherein, for the second regulated voltage, a rate of voltage variation at a time of heavy loading is small in comparison to the first regulated voltage.

12. The integrated circuit apparatus according to claim 10, further comprising a voltage monitoring circuit electrically coupled to the first regulator circuit and configured to detect the second regulated voltage reaches a reference level,
  wherein the control circuit is configured to cause the second regulator circuit to transition from the off-state to the on-state, and
  wherein, upon detecting by the voltage monitoring circuit that the second regulated voltage reaches the reference level, the first regulator circuit is configured to be switched to the off-state so that the second regulated voltage is supplied to the analog circuit.

13. The integrated circuit apparatus according to claim 10, wherein the first regulator circuit includes a first circuit unit and a first output stage, and
  wherein the control circuit is configured to cause the first regulator circuit to be in the off-state, such that in the first regulator circuit, only the first output stage is in the off-state.

14. The integrated circuit apparatus according to claim 13, wherein the control circuit is configured to cause the second regulator circuit to transition from the on-state to the off-state, such that the first output stage of the first regulator circuit becomes in the on-state.

15. The integrated circuit apparatus according to claim 10, wherein, after a power supply voltage is applied to the integrated circuit apparatus by an external device, and the power supply voltage finishes rising within the integrated circuit apparatus, the control circuit is configured to:
  cause the first regulator circuit to transition from the off-state to the on-state; and
  cause the second regulator circuit to be in the off-state, so that a start state of the integrated circuit apparatus is maintained until the first regulated voltage reaches a predetermined voltage.

16. The integrated circuit apparatus according to claim 10, wherein each of the first regulator circuit and the second regulator circuit is a linear regulator.

17. An integrated circuit apparatus comprising:
  a first regulator circuit configured to generate a first regulated voltage,
  a second regulator circuit configured to generate a second regulated voltage, and
  a control circuit configured to perform selection with respect to the first regulator circuit and the second regulator circuit such that one regulator circuit among the first regulator circuit and the second regulator circuit is in an on-state and another regulator circuit is in an off-state,
  wherein the control circuit is configured to:
    detect that a load current is greater than or equal to a predetermined load current;
    output a first control signal to the second regulator circuit upon detecting that the load current is greater than or equal to the predetermined load current, to cause the second regulator circuit to be in the on-state;
    detect that the load current is less than the predetermined load current; and
    cause the first regulator circuit to be in on-state upon detecting that the load current is less than the predetermined load current, and
  wherein the second regulator circuit is configured to:
    receive the first control signal from the control circuit;

generate a second control signal to switch the first regulator circuit from the on-state to the off-state, based on assertion of the received first control signal; and output the second control signal to the first regulator circuit.

18. The integrated circuit apparatus according to claim 17, wherein the second regulator circuit is configured to:

receive a voltage level signal indicating that the generated second regulated voltage reaches a reference level; and generate, in response to receiving the voltage level signal, the second control signal to switch the first regulator circuit from the on-state to the off-state, based on the assertion of the first control signal.

\* \* \* \* \*